United States Patent
Grabill et al.

(10) Patent No.: US 11,593,341 B2
(45) Date of Patent: Feb. 28, 2023

(54) METHOD AND SYSTEM FOR ROW LOCK SOLUTION

(71) Applicant: salesforce.com, inc., San Francisco, CA (US)

(72) Inventors: Carolyn Leigh Grabill, San Francisco, CA (US); Bruno Lucas Montaner Etcheverry, San Francisco, CA (US); Alan Cardel Molina, San Francisco, CA (US); Christopher Albert Peterson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 221 days.

(21) Appl. No.: 16/778,930

(22) Filed: Jan. 31, 2020

(65) Prior Publication Data

US 2021/0149867 A1    May 20, 2021

Related U.S. Application Data

(60) Provisional application No. 62/936,184, filed on Nov. 15, 2019.

(51) Int. Cl.
G06F 16/00 (2019.01)
G06F 16/22 (2019.01)
G06N 3/04 (2023.01)
G06N 3/08 (2023.01)
G06F 16/26 (2019.01)

(52) U.S. Cl.
CPC .......... *G06F 16/2272* (2019.01); *G06F 16/26* (2019.01); *G06N 3/04* (2013.01); *G06N 3/08* (2013.01)

(58) Field of Classification Search
CPC ....... G06F 16/2272; G06F 16/26; G06N 3/04; G06N 3/08
See application file for complete search history.

(56) References Cited

U.S. PATENT DOCUMENTS

2005/0234989 A1* 10/2005 Bailey ................ G06F 16/2343

* cited by examiner

*Primary Examiner* — Tyler J Torgrimson
(74) *Attorney, Agent, or Firm* — Sterne, Kessler, Goldstein & Fox P.L.L.C.

(57) ABSTRACT

Described herein is a system and method for performing an updating of child records associated with a parent record within the specified time period, wherein the parent record has a value including a sum of values present in the associated child records, wherein a row lock on the child records is obtained, and the update is performed, and wherein such an update does not require a row lock on the associated parent record, wherein the parent record is periodically updated within the specified time period.

20 Claims, 6 Drawing Sheets

METHOD AND SYSTEM FOR ROW LOCK SOLUTION

BACKGROUND

Relational databases are often used by entities to represent a parent child hierarchy, in a variety of applications. Often, this is in the form of a parent table linked to a child table by a foreign key (keys that reference a primary key, or column designated to uniquely identify all table records, in another table). For several of these applications, the parent record needs to keep a count of the sum of values in a numerical field from related child records. These applications are vast and wide-ranging. One application is voting on features for product development by a development team, wherein a field from child records could cast a vote, for a particular parent record, which may be a feature to be potentially developed. After a specified time period, votes can be tabulated, and the product feature with the most votes can proceed for development.

Similarly, other envisioned applications to be processed in an analogous manner also tabulate the sum of associated child records for a respective parent record. These may include assessing sales of a product several agents of a company have made to determine commission, wherein if the agents as a group have not made enough sales, reforming steps of commission cuts may be needed, etc. Another application may be voting within a specified time period for a certain class to be taken by students at a school, where e.g. only the class with the most votes may offered, or a class with not enough votes may be cut, etc. Like this, virtually any application wherein child records may be represent a vote, tally, or performance statistic, and are assessed over time and summed to determine an associated parent record field or statistic, which is important in making a decision may use relational databases in this manner.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Figure 1:
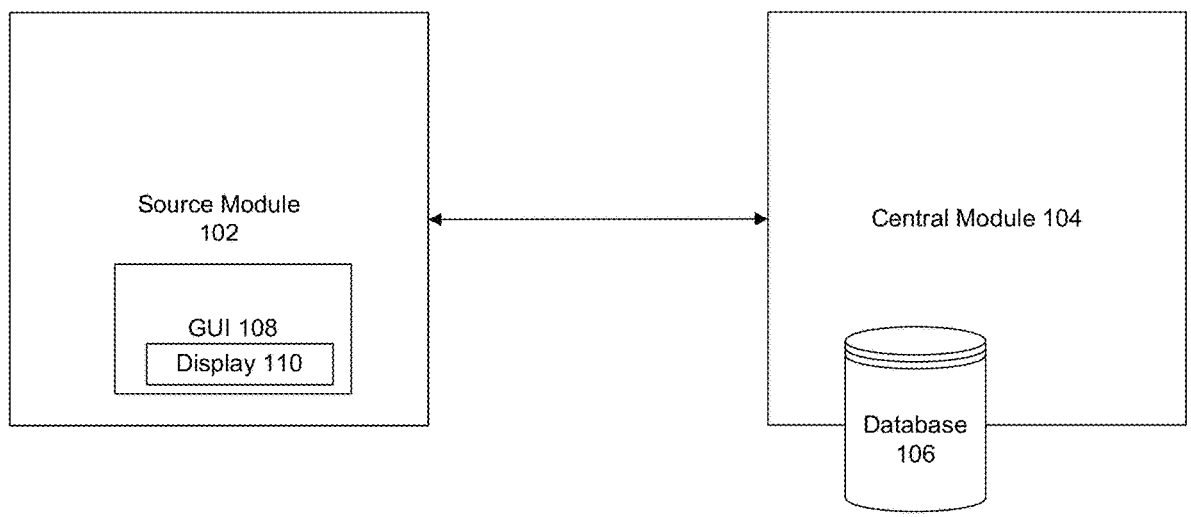
FIG. 1 is a block diagram of an example embodiment where a central module is accessed by a source module to update a child record in a relational database.

Provided herein are system, apparatus, device, method and/or computer program product embodiments, and/or combinations and sub-combinations thereof for updating child and parent records in a relational database.

Oftentimes, within usage of databases as described above, problems are often encountered when multiple child records need to be updated in close temporal proximity to each other. In particular, updating a child record often requires what is termed as a "row lock," or a lock on a single row of a table. A transaction acquires a row lock for each row which may need to modified through insertion of a field, updating a field, deletion, merging, etc, effectively locking other transactions out from modifying the same row. In this way, row locks primarily serve as a prevention mechanism to form a queue and prevent two transactions from modifying the same row at the same time. If two transactions were to modify the same row at the same time, a first of these two transactions may essentially be lost through modification by the second one.

However, in forming a row lock on the child record for the applications described above, wherein a field of associated child records may be summed to determine a parent record field, conventional protocol has required simultaneously requiring a row lock on the corresponding parent record. As a result both the child record, and the summed total of associated child records in the parent record, are simultaneously updated. One drawback, however, of requiring a row lock on the corresponding parent record, while a child record is being updated, is that other child records of the parent record are not able to be updated until the updating is finished. For example, if one child record is being updated, the simultaneous row lock on the parent prevents other child records of that same parent record from accessing the parent record, such that the required parent record row lock cannot be obtained. This results in other child records themselves not being updated until the row lock of the parent can be released.

For such applications involving relational databases with a parent and child records in the manner described, with a parent record field associated with the sum of respective child record fields, requiring the row lock on the corresponding parent record is a drawback. While a first child record is being updated, other child records corresponding to the same parent record are not able to be updated until the updating of the first child record is finished. That is, if one child record is being updated, the simultaneous row lock on the parent prevents other child records corresponding to the same parent record from accessing the parent record, such that the required parent record row lock cannot be obtained. This results in other child records themselves not being updated until the row lock of the parent can be obtained. In particular, a subsequent updating of another child record transaction needs to wait until a prior updating of a child record is transaction is either committed (occurs), or is withdrawn.

The attempted access of a row lock on a parent record by update requests for multiple child records, which all need to be updated in close temporal proximity, is known as row-lock contention, and can only be resolved when the prior transaction either performs a commit (carries through the updating or modifying of the child and parent record) or is rolled back. In addition to large lag and wait times, this also in a way pushes the prior transaction to quickly come to a conclusion so that the waiting transactions can take place, and may cause various errors or database inconsistencies. One such error, for example, may be a buffer or stack overflow. In a large database with many child records associated with a single parent, if a large number of child record update requests are trying to access the parent record to obtain a row lock on the parent for updating of corresponding child records, row lock contention may lead to a large number of such requests needing to be stored in a buffer, which may in turn run out of space. Such latencies may also be targeted by hostile elements for exploiting the database through, e.g., a buffer overflow or brute-force type of attack, etc, which may in turn compromise the entire database. This can be particularly harmful if the database comprises any sensitive or private information. Many other such database problems and inconsistencies result from row-lock contention.

To resolve this issue, the system and methods described herein may only allow updates to child records during a specified time period, without requiring a row lock on the parent record. In this manner, during the specified time period, requests to update the records of multiple child records associated with a common parent may be able to be processed swiftly by requiring a row lock on the respective child. By acquiring a row lock on the respective child, the child records may modify, update, or insert a field in the respective child record with a vote, tally, statistic, etc. that is to be later summed and associated with the parent record.

Such a system and methods eliminate the need for any extensive buffer to hold requests for updating different child records associated with a common parent record, eliminate latencies and delays, and eliminate database errors and inconsistencies resulting from requiring dual row locks on both parent and child records.

FIG. 1 is a block diagram of a data-transfer environment 100 showing the interaction between a source module 102, which may be accessed by a user seeking to update a child record in a database 106 of a central module 104. The user of the source module 102, using the disclosed embodiments, may be able to update several child records in the database with a vote, tally, or performance statistic related to a summed total represented in an associated parent record in the database, in an application of the type described above.

Figure 6:
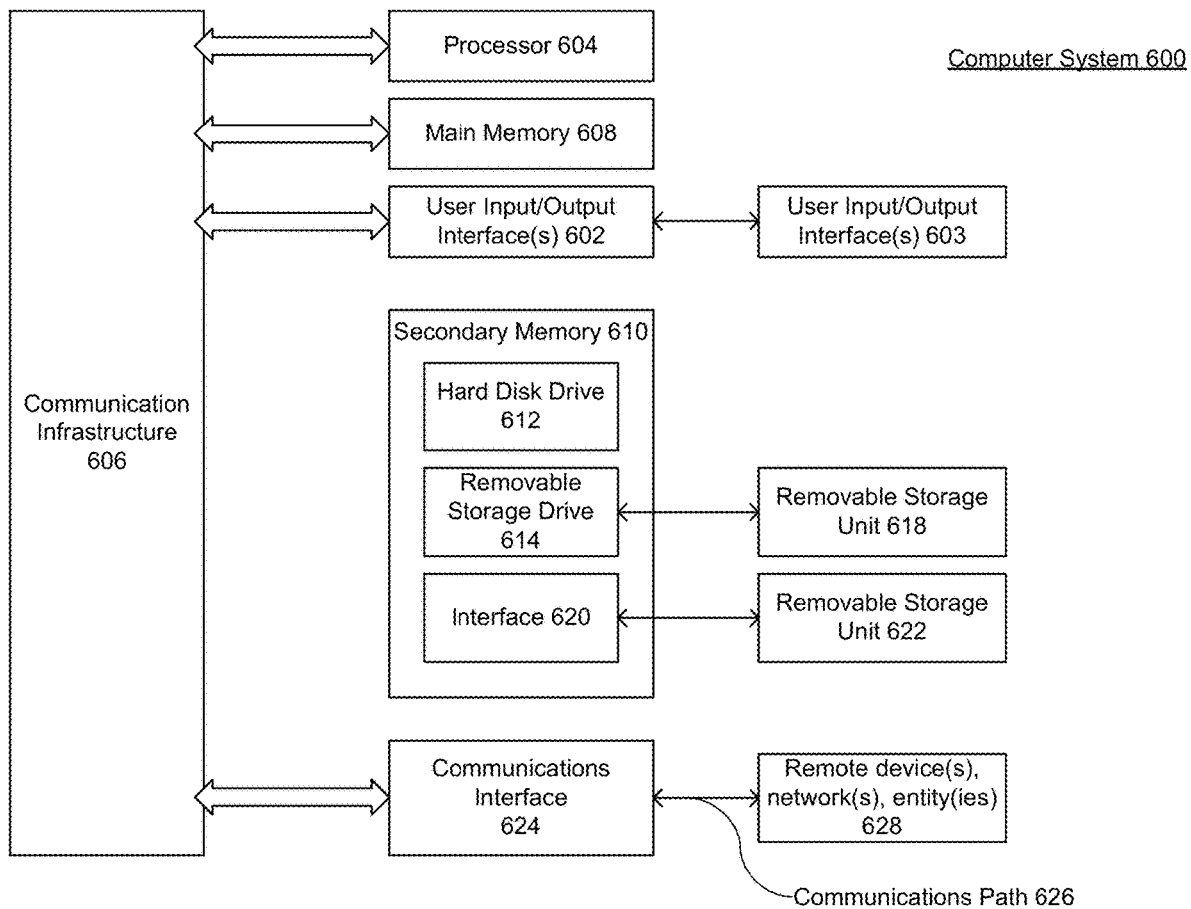
FIG. 6 is a block diagram of example components of a computing system according to an embodiment.

According to an embodiment, the central module 104 and the source module 102 may comprise one or more separate computer systems such as the computer system 600 shown in FIG. 6. According to an embodiment, the database 106, may be present on an existing computer system 600 of the central module 102.

Figure 2:
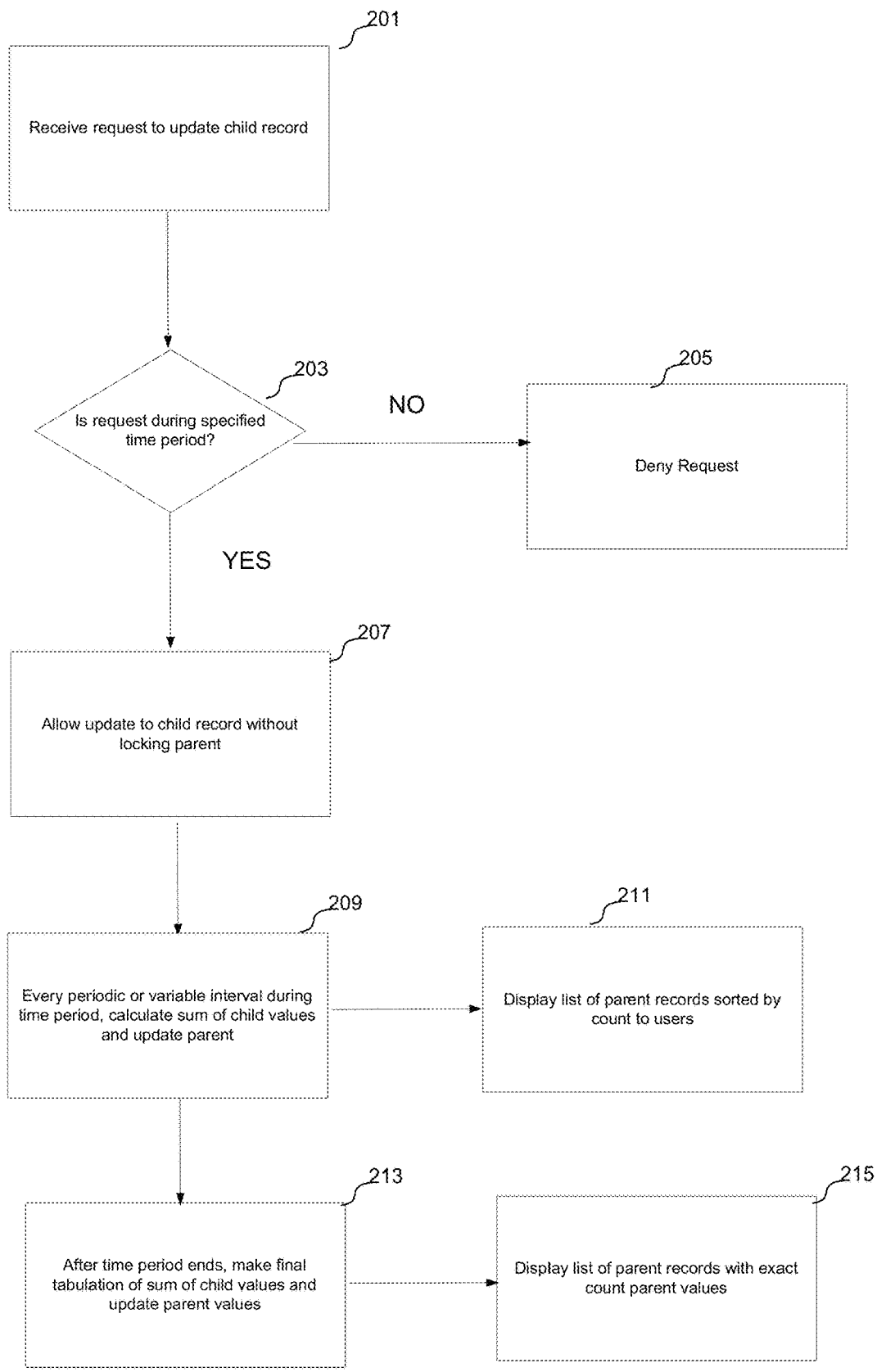
FIG. 2 is a flowchart illustrating the process in the central module for updating the child record.

Once a request is received at the central module 104 from the source module 102 for the updating of a child record, the flow of the process for conducting of said update in the database 106 by the central module 104 is shown in FIG. 2. In block 201, the request to update a child record is first received from the source module 102. Because updates to child records are only allowed within a specified time period, the process first checks in step 203 whether the request has been received during a specified time period. If it has not, the request is denied in step 205 ("NO" from step 203), and no further action is taken by the central module. If the request is received timely within the specified time period ("YES" at step 203), the central module 104 proceeds to further steps for processing the request.

At step 203, the specified time period that requests are allowed depends on the application the database 106 is being used for. This may be decided by the administrator of the central module 102, or if there are separate users of the central module 102, then a specific user, which may be utilizing the database 106, or a provisioned portion of said database 106, for a particular application. The specified time period also may be pre-determined or variable. For example, for a voting application, in which product features are being voted on by members of a development team, wherein the product features itself may be the parent records, and the votes of the members of the development team may be fields of respective child records for each member, a pre-determined voting period of several weeks may be set. In this way, a response from the members of the development team can be ensured, etc. Similarly, another application is for summing sales commissions to determine team performance for sales of a product. Here, the products may be the parent records, and the commissions for each sales agent may be fields of respective child records, wherein the time period may be variable and not fixed, within a certain range, to gauge performance of the team as a whole, etc.

At step 207, if the received request is received timely within the specified time period, whether that time period is pre-determined or variable, the child record is allowed to be updated without the locking of the associated parent record. To provide an illustrative example at a small scale of the process in the flowchart in FIG. 2, a sample parent child scheme has been shown in FIG. 3. In this scheme, there are six child records comprising of six homerooms (Homerooms 1-6, elements 304, 306, 308, 310, 312, and 314 respectively). Each homeroom may comprise, e.g., 20 students each. All of these homerooms, in turn, may be representative of physical homerooms in a school or college, which may have students voting on a class to take the following semester 302, wherein such a class 302 may be a parent record. This example is shown in table representational form in FIG. 4B, with parent table 402b and child table 404b. The class 302 entity in FIG. 3 may represent the class to be chosen, out of candidate classes 1, 2, and 3 in column 402b1 of parent table 402b (wherein each ParentID represents a unique class candidate). In an analogous manner, the childID 404b1 in the child table 404b may represent the homeroom number (1-6), corresponding to 304, 306, 308, 310, 312, and 314 respectively in FIG. 3.

In the example, the primary key of the parent table 402b is the parentID column 402b1, and the primary key of the child table 404b is the childID column 404b1, as these columns contain a unique value for each row of data. The parentID column 404b2 of the child table 404b is the foreign key linking the parent table and child table, because it identifies the candidate class number (parentID 404b2, corresponding to parentID 402b1) that the students of the homeroom (childID 404b1) are voting on. The class election column 404b3 may represent the results of the student voting from the homeroom, for those in favor of electing to take the candidate class of column 404b2 the following semester. For example, in the first row, in homeroom 1, which is 304 in FIG. 3 and childID "1" in child table 404b, 18 students out of 20, as indicated in 404b3, may have elected to take class 1, since the parentID 404b2 in the first row is 1. As more students vote and results come in during a specified time period, these records need to be updated.

In this case, for example, a week of voting may be set as the specified time period (depending on the application it can be any time period on the scale of milliseconds, seconds, minutes, hours, days, weeks, months, or years). FIG. 4B shows the result after the time period is completed. Such a time period may be optimized for collecting input from enough users within a short period of time, or a long period of time, reflecting the need of the user and the timeline of the user. However, before it is completed, and during the time period, the numbers in 404b3 and 402b2 are changing as new votes come in from students. If a request to update the row 1 record of class election 404b3, e.g., is received, to change 404b3 from 15 to 18 (18 as shown in FIG. 4B) within the time period, as described above, the process in FIG. 2 proceeds to step 207. At step 207, row 1 of child table 404b (comprising the first row child record) is locked, as shown by the lock symbol to the left of the first row record in FIG. 4B.

Upon being locked, the row 1 is unable to be accessed by any other concomitant requests to update row 1 (which waits as described above for the pre-existing transaction to be committed or to be withdrawn) until the current request is finished being processed. Once the request is committed, then the class election record 404b3 of the first row is then altered by the process from 15 to 18, without obtaining a row lock on the associated parent record (which in this case would be the first row of the parent table 402b, containing the parentID 1 in column 402b1) and changing the respective total in column 402b2. Significantly, as a result, multiple rows of the child record table 404b may be able to be updated at the same time, since now a lock on the associated parent row is not needed (e.g. in this case, rows 1-3 of the child table 404b, even though all of them are associated with the same parentID 1 of the parent table 402b, and the first row of the parent table 402b, may be able to be updated at the same time).

This ability to simultaneously update records greatly cuts down on processing time and eliminates latencies, especially so in the case where many child records may be associated with one parent record. Steps 207 and 209 occur continuously throughout the specified time period, and the arrows shown in FIG. 2 are not meant to be a temporal sequence indicator with respect to step 207 or step 209.

At step 209, within the specified time period, at periodic or variable intervals during the time period, a sum of child record values may be summed and the corresponding parent field may be updated. In the example described above, the first three rows of 404b3 may be summed up in periodic or variable intervals (of seconds, minutes, hours, days, etc.) to update 402b2 column corresponding to the total number of votes cast for electing to take class 1 the following semester. Updating the total number of votes cast for electing to take candidate classes 2 or 3 the following semester (updating the second and third rows of 402b2, respectively) largely follows the same process as for candidate class 1. The updating of the parent field may follow the same process as followed for updating the child field in 207, wherein a row lock may be obtained on the parent field (row lock on the first row of 402b in the above example for updating the votes cast for electing to take class 1) and the sum value may be updated. However, by performing the update of the parent record field collectively in this manner, wherein it is only updated periodically with the updated sum totals from the child record fields, there is a drastic reduction in the frequency of row locks of the parents that are needed. Consequently, by dissociating the need for having row locks on parent records as a pre-requisite for updating the values of corresponding child records, there is hardly any latency with respect to a row lock on the parent record holding up a concomitant updating transaction to a corresponding child.

In addition, at this step, there is a necessary tradeoff that occurs, between usage of CPU resources and accuracy of parent records. In particular, if the interval at step 209 is a long interval, then as the changes in class election column 404b3 of child records occur between summations, none of these changes are reflected in the updating of the 402b2 column in table 402b, until the next summation takes place after the interval. In step 211, the results of these summations may be displayed in the form of parent records sorted by count to the user of the source module 102. For example, the results for the sum totals of each candidate class may be populated on a GUI 108 of the source model 102. A display button 110 is also shown as part of the GUI 108 in FIG. 1. The results populated on the GUI of the source module 102 may be from the results of the tabulations conducted in the database 106 of the central module 104. Because as shown in FIG. 2 at step 211 the results of the parent records are displayed sorted by count, as the interval for updating child records in step 203 becomes longer, the chances for the parent records reflecting inaccurate totals increases the chances that the user is receiving inaccurate information, and further that the sorted order of parent records displayed to the user may not be correct.

On the other hand, if the interval is kept very short, there is a massive usage of computing resources, wherein for a very large database, continuously updating the sums of a plurality of parent records each associated with a plurality of child records on a scale of, e.g., milliseconds, would slow down computer resources, may cause memory read/write errors, etc. As a result, there may be pre-set interval times that can be determined depending on the application that is to be used. In particular, machine learning techniques and logic may be employed by the central module 104, depending on the particular application, to determine an interval time that may be optimal in the sense of using minimum computer resources, while still reflecting a relatively accurate order to the user. Such techniques may include logistical regression, or a decision-making structure, such as a random forest, support vector machine (SVM), K-nearest neighbors algorithm, bootstrap aggregation, naïve Bayes, or multi-tiered neural network, with or without back-propagation, and with or without k-fold cross validation.

Figure 3:
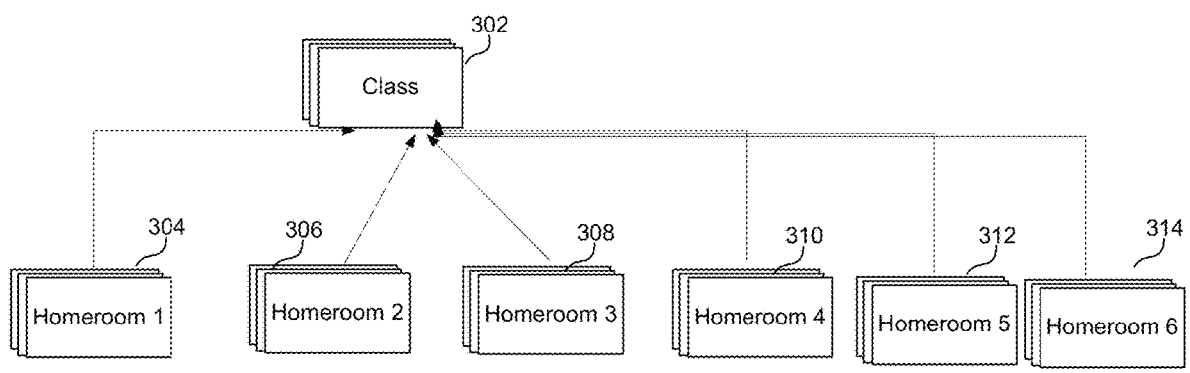
FIG. 3 is a block diagram of an example environment in which systems and/or methods described herein may be implemented according to an example embodiment.
Figure 4A:
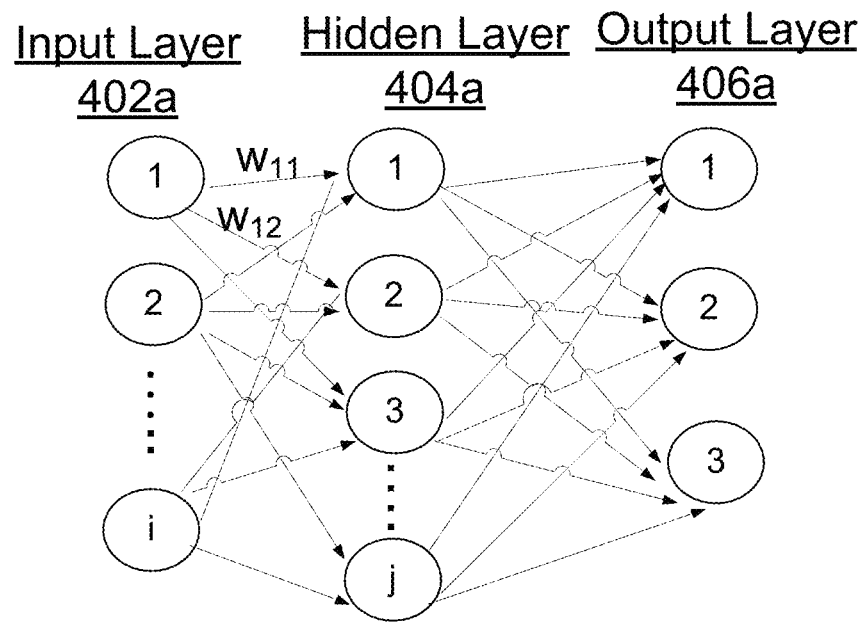
FIG. 4A is an example of a neural network which may be used to determine an optimal tabulation time period, according to an embodiment.
Figure 4B:
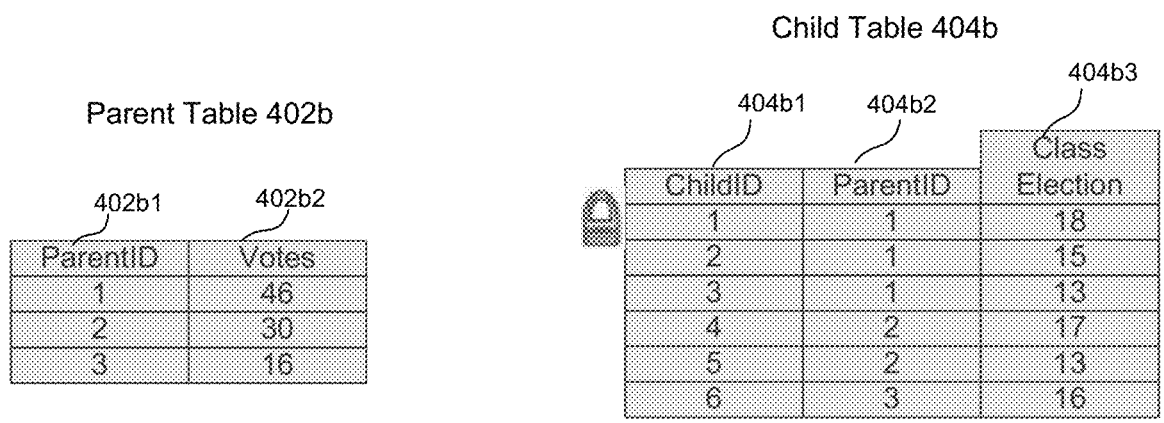
FIG. 4B is a sample parent and child table in a relational database undergoing an updating of child records, according to an embodiment.

For example, a multi-layer neural network is shown in FIG. 4A. In this example, a number of associating factors may be analyzed in the input layer 402a, resulting in a numerical output for a plurality of different candidate interval times in the output layer 406a. For example, in the example shown in FIGS. 3 and 4B, associating factors which may be used in the input layer may include age of students, school district, geographical location of school, etc. In other applications, for example voting on a product feature to be developed, other associating factors such as type of feature (backend vs. frontend), coding tools associated with feature, past versions if available of feature, etc. may be used. The output layer 406a may comprise a plurality of candidate interval timings (e.g. bubble 1 may represent 30 seconds, bubble 2 may represent 1 minute, bubble 3 may represent 1 minute and 30 seconds, and so on), wherein the network based on tuned weights from the input layer 402a to the hidden layer 404a, may result in higher or lower output for bubbles 1-3. Finally, the results of bubbles 1-3 may be compared relative to each other, and the bubble with the higher result may be chosen as the optimal time interval to be used in the process shown in FIG. 2.

As mentioned, the number of elements in the input layer 402a reflects the number of features to be analyzed with respect to determining interval timing, and the number of elements in the output layer 406a reflects the number of candidate timings to be analyzed. The number of elements in the hidden layer 404a may be any number of elements, but in an embodiment may be between the size of the input and the size of the output layers. In a further embodiment, the number of elements in the hidden layer 404a may be the mean of the number of elements in the input layer 402a and the output layer 406a. Initially, weights from the input layer to the hidden layer (represented by $w_{i,j}$ in FIG. 4A) may be set as random numbers in the range of 0 to 1. As database data is received for a particular application, feature analysis metadata may be gathered (either by input from the user of the central module 104 or from the data itself). In the example as shown in FIGS. 3 and 4B, as described feature analysis may include the inputs of age of students, school district, geographical location of school, etc. in layer 402a.

As seen in FIG. 4A, each node in the hidden layer 404a has inputs from all of the inputs in the input layer 402a. Similarly the output layer has inputs from all of the inputs in the hidden layer 404a. An output from the neural network can be calculated by propagating an input signal through each layer until the output layer outputs its values. Error, which may be determined by using reference examples in training data, or through trial and error (empirical user determination that too many computer resources are being used, or conversely that the order is too inaccurate, etc.) may be used to calculate a difference between expected outputs and outputs propagated by the neural network. That is, for example, it may be known in a particular situation that the optimal time period is 1 minute, then the node for 1 minute (e.g. node 2 in output layer 406a) may be set to 1 and the other nodes set to 0 as an expected output. Then the difference between these expected outputs and the outputs actually forward propagated by the neural network can be compared, and the differences calculated at each output node. The errors are then propagated backward through the nodes of the neural network (from the output layer 406a to the hidden layer 404a, and onward to the input layer 402a), wherein the weights are updated at each layer.

This process can be repeated to develop weights $w_{i,j}$ at each layer that are accurate, and can indicate the right output node, indicating the right time interval, consistently. Then, once trained with training, the process can be used on testing data. However, if there is no training data, techniques such as k-fold cross validation can be used, wherein data can be randomly partitioned into k equal sized subsamples. Of these subsamples, a single subsample may be retained as the validation data for testing the model, and the remaining k−1 subsamples may be used as training data. Then, each remaining subsample can be cycled through as test data, with the remaining k−1 subsamples used as training data. In this manner, the model can be used to give an interval time for each separate set of inputs.

Finally, at step 213 of the process in FIG. 2, immediately after the specified time period has ended, a final summation of child values is made, and the associated parent record values are updated. In the example shown in FIGS. 3 and 4B, a final summation of the class election column 404b3 for all rows in table 404b may be made, and accordingly the corresponding parentID's for classes 1-3 in table 402b may have their column 402b2 values updated, reflecting the total number of votes received for each class. Each row with a ParentID 404b2 value corresponding to the same parentID candidate class value is summed, and this summation is represented as the 402b2 value. This information, in turn, may be displayed in step 215, which may be in an analogous manner to the information displayed in step 211 (e.g. to the GUI 108 of the source module 102). Finally, based on the updated sorted list of parent records, a decision may be taken depending on the application in which the child and parent records are used.

In the example shown in FIGS. 3 and 4B, based on the total number of votes received for classes 1-3 in table 402b, a decision to elect to offer class 1 the following semester based on homeroom feedback, where class 1 has the most votes (46, compared to 30 for class 2 and 16 for class 3), may be taken.

To aid in describing the system and methods of FIG. 1-4, an example embodiment of the underlying structure will be described. The underlying structure of a computer system 600, shown in FIG. 6, can implement a database and the sending and receiving of data. Although such a computer system, may include source module 102, central module 104, and database 106, in the embodiments described below source module 102 and central module 104 lie on different computer systems 600. Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602. In particular, a monitor of computer system 600 used for the source module 102 may be able to display the results of the process at steps 211 and 215 in a user GUI 108.

One or more processors 604 may be a graphics processing unit (GPU). In an embodiment, a GPU may be a processor that is a specialized electronic circuit designed to process table data received from database 106 when data is to be processed in a mass quantity, for example for the updating of child records, and the summing up of relevant child records at time intervals determined for step 209. The GPU may also be used in the process of determining the time intervals itself, wherein as described above machine learning logic of the type shown in FIG. 4, e.g. a neural network, may be used. The GPU may have a parallel structure that is efficient for parallel processing of large blocks of data, such as mathematically intensive data common to computer graphics applications, images, videos, word-processing documents, PDF files, and the like, any of which can include table data received from database 106 as described above, which may also be used in k-fold cross validation processes as training data to train a neural network as shown in FIG. 4A to correct initial weights assigned and effectively determine optimal interval time given specific feature inputs.

Computer system 600 can also include a main or primary memory 608, such as random access memory (RAM). Main memory 608 can include one or more levels of cache (including secondary cache).

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote entities 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the source module 102, the central module 104, the flight data repository 106 and the transaction data repository 108 in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 502 which will be explained infra; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing the database 106, as an example approach, the computer system 600 may use an in-memory database with persistence, which may store and access data objects from the primary memory 608 of the computer system 600 with a transaction log for persistence being stored in secondary memory 610. Such a database can be used for storing and accessing the constituent data objects and parent/child data tables of the database, where transaction data is used to create row locks, and update child and parent record fields.

Alternatively, for storing and accessing the constituent data objects of these repositories, the computer system 600 may implement only part of the data present as an in-memory database, using less primary memory 608 than the first embodiment as described above, to reduce the in-memory footprint, and may instead store a larger portion of the data as a disk-based database within the secondary memory 610 (more frequently accessed data is stored in primary memory 608 while less frequently accessed data is stored in secondary memory 610).

The central module 104 is present along with database 106 in a computer system 600, so the computer system 600 may implement the database using the communication infrastructure 606 for communication between the central module 104 and database 106, but may send data to the source module 102 through the communications interface 624, through communications path 626, where central module 102 is a network entity 628.

Figure 5:
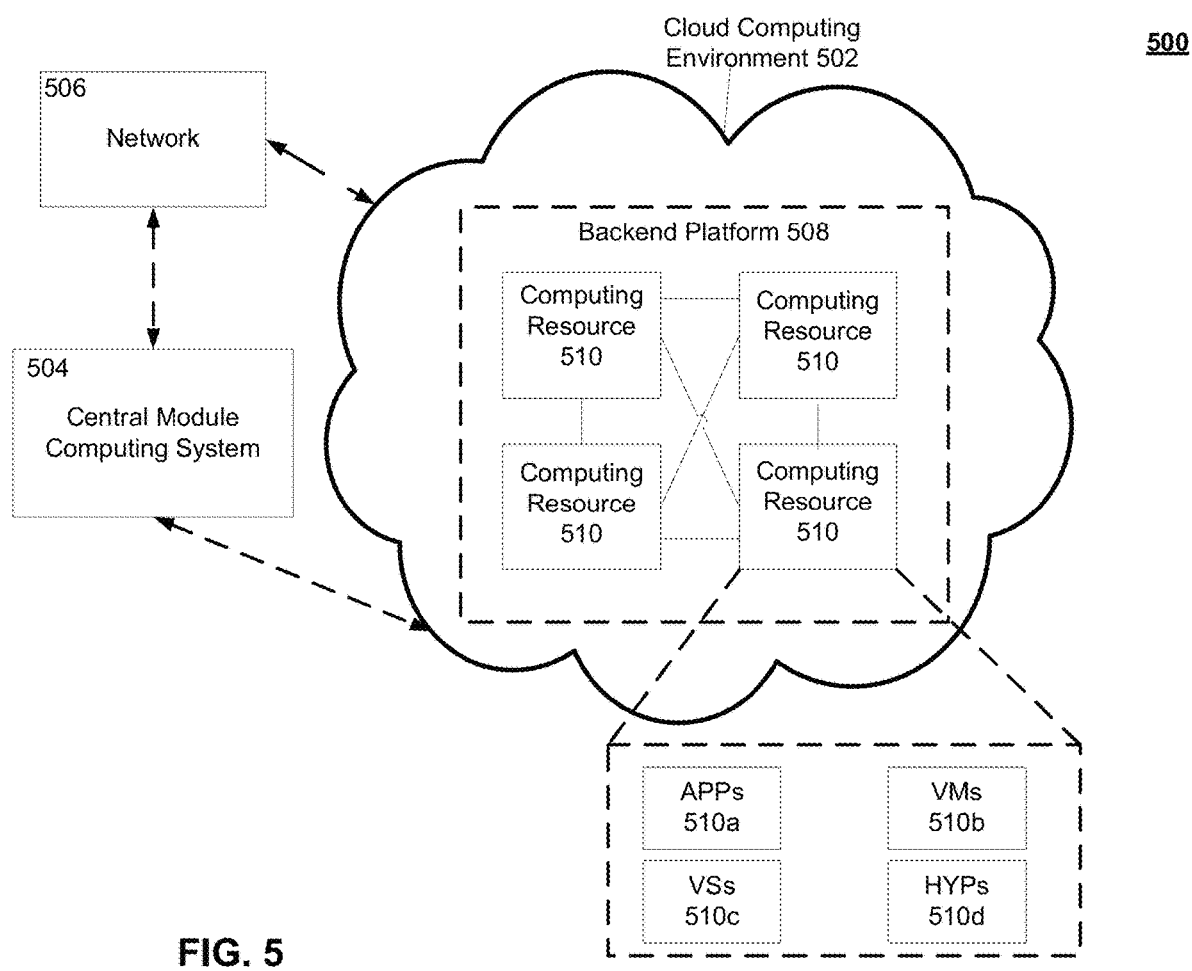
FIG. 5 is a block diagram of an example cloud computing environment according to an embodiment.

As shown in FIG. 5, cloud computing environment 502 may contain backend platform 508, in a block diagram of an example environment 500 in which systems and/or methods described herein may be implemented. The central module 104 of FIG. 1, described above, may also include a host such as cloud computing environment 502. The cloud computing environment 502 may be accessed by the central module computing system 504, of the same type of computing system 600 as described above, wherein in an embodiment the central module computing system 504 is included in the central module 104. In this case, the central module computing system 504 of FIG. 6 may access the cloud computing environment 502 by a communication or network interface 624 as shown in FIG. 6, wherein a network gateway 506 may comprise a remote entity 628 accessed by the communications path 626 of the central module computing system (where the three entities 502, 504, and 506 shown in FIG. 5 would correspond to the central module 104 of FIG. 1). Alternately, the computing cloud environment 502 itself may correspond to a remote entity 628 in FIG. 6, and may be accessed directly by the central module computing system 504 through a communications path 626, for example through an application protocol interface (API), eliminating the need for a network gateway 506 (both options are shown in FIG. 5, wherein the flow path above the central module computing system 504 uses a network gateway 506, and the flow path below the central module computing system 504 connects directly to the cloud computing environment 502, both shown using dashed bi-directional lines).

The devices of the environments 500 and 100 may be connected through wired connections, wireless connections, or a combination of wired and wireless connections.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 104 of FIG. 1 may have a central module computing system 504 as shown in FIG. 5 comprising a computer system of the same type as the computer system 600 as shown in FIG. 6. The source module 102 may access the central module 104 through the central module computing system 504, wherein the source module 102 may be an external network entity 628 from the perspective of the central module computing system 504 in an embodiment, and may send data back and forth in the form of data packets through the communications path 626 of the communications interface 624 of computing system 504, using e.g., TCP/UDP/FTP/HTML5 protocol. Alternately, the source module 102 may access the central module 104 through a front-end application 510a (e.g. a web browser application, a web browser extension, proprietary OS application, standalone executable application, command line access shell program, FTP/UDP/TCP/HTML5 protocol, etc.) hosted as an application 510a on a computing resource 510 (explained infra) within the cloud computing environment 502 hosted by the central module 104, in an embodiment. Such an application 510a may comprise a GUI of the type 108 in FIG. 1 as explained above. As mentioned, in steps 211 and 215, the results of the parent record values may be displayed in the GUI. Alternative to, or in addition to, the display in step 211, a display button may be present on the GUI 108, which may be within the application 510a, or as a standalone application displayed from the results gathered from central module 104 on the source module 102. By clicking on the display button 110 during the specified time period, a user can instantly see what the results are during the current interval for the parent record values, sorted by count. As described in 211, because the parent records are sorted by count, the count is not displayed by default. However, in an embodiment, the count of the parental record values (e.g. column 402b2 in FIG. 4b) may also be displayed on the GUI, at step 211, in the specified time period.

The backend platform 508 in FIG. 5 may include a server or a group of servers. In an embodiment, the backend platform 504 may host a cloud computing environment 502. It may be appreciated that the backend platform 502 may not be cloud-based, or may be partially cloud-based.

The cloud computing environment 502 includes an environment that delivers computing as a service ("CaaS" as described above), whereby shared resources, services, etc. may be provided to the central module computing system 504 and/or the backend platform 508. The cloud computing environment 502 may provide computation, software, data access, storage, and/or other services that do not require end-user knowledge of a physical location and configuration of a system and/or a device that delivers the services. For example, the central module computing system 504, as well as source module 102 may receive data stored within or hosted on a database within computing resources 510 within the backend platform 508, through an application protocol interface (API) or any of the various communication protocols previously listed. The cloud computing environment 502 may include computing resources 510.

Each computing resource 510 includes one or more personal computers, workstations, computers, server devices, or other types of computation and/or communication devices of the type such as computer system 600 described above. The computing resource(s) 510 may host the backend platform 508. The cloud computing resources may include compute instances executing in the cloud computing resources 510. The cloud computing resources 510 may communicate with other cloud computing resources 510 via wired connections, wireless connections, or a combination of wired or wireless connections as described above.

Computing resources 510 may include a group of cloud resources, such as one or more applications ("APPs") 510a, one or more virtual machines ("VMs") 510b, virtualized storage ("VS") 510c, and one or more hypervisors ("HYPs") 510d.

An application 510a may include one or more software applications that may be provided to or accessed by a computer system 600. In an embodiment, the central module 104 may only include a cloud computing environment 502 executing locally on a computer system 600 of the central module computing system 504. The application 510a may include software associated with backend platform 508 and/or any other software configured to be provided across the cloud computing environment 502 (e.g. to source module 102). The application 510a may send/receive information from one or more other applications 510a, via one or more of the virtual machines 510b. Computing resources 510 may be able to access each other's applications 510a through virtual machines 510b, in this manner. In an alternate embodiment, a separate central module computing system 504 is not needed, and the central module 104 only comprises the cloud computing environment 502, hosted and executed by computing resources 510, and communicating with the source module 102 using the communications interface 624 of one of the computing resources 510, or via app 510a, using any of the various communication protocols mentioned above.

Virtual machine 510b may include a software implementation of a machine (e.g., a computer) that executes programs like a physical machine. This may be of particular use in the alternate embodiment where there is no separate central module computing system 504 of the type of computer system 600. In this embodiment, the central module computing system 504 may be a virtualized machine 510b, and may communicate with source module 102 using the various communication protocols listed above, via an application 510a. Virtual machine 510b may be either a system virtual machine or a process virtual machine. A system virtual machine may provide a complete system platform that supports execution of a complete operating system (OS). A process virtual machine may execute a single program and may support a single process. The virtual machine 510b may execute on behalf of a user (e.g., the administrator of the central module 104) and/or on behalf of one or more other backend platforms 508, and may manage infrastructure of cloud computing environment 502, such as data management, synchronization, or long duration data transfers, and accessing the database 106.

Virtualized storage 510c may include one or more storage systems and/or one or more devices that use virtualization techniques within the storage systems or devices of computing resource 510. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 104 flexibility in how they manage storage for evaluation data from processing of data accessed from the database 106. File virtualization may eliminate dependencies between data accessed at a file level and location where files are physically stored. This manner of block and file virtualization may enable optimization of storage use, server consolidation, and/or performance of non-disruptive file migrations.

Hypervisor 510d may provide hardware virtualization techniques that allow multiple operations systems (e.g., "guest operating systems") to execute concurrently on a host computer, such as computing resource 510, which may include a computing system of the type of computing system 600, and can in this manner host a virtualized hardware of a central module computing system 504. Hypervisor 510d may present a virtual operating platform to the guest operating systems, and may manage multiple instances of a variety of operating systems as these "guest operating systems," which may share virtualized hardware resource, such as RAM, which may for instance access the data in the form of a database of 106, which may be used for multiple operating systems for multiple applications of the type described above. Alternately, secondary memory may be accessed using virtualized storage 510c, or on physical storage, such as the hard disk drive 612, of a computing resource 510 of the type of computing system as computing system 600. In embodiments heretofore described, using a combination of RAM and secondary memory to access the database, such that a portion of the database may be in-memory and a portion of the database stored in files, is also envisioned. Further, source module 102 may also include an environment 500 with a cloud computing environment 502, instead of only a computing system of the type of computing system 600.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Applicant rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for using a database, the method comprising:

obtaining, by one or more computing devices, a row lock on a plurality of child records and updating counts corresponding to the plurality of child records during a specified time period during which the update is permitted, wherein the plurality of child records are part of a table in a database with a plurality of child and parent records, wherein the plurality of child records are children of a parent record of the plurality of parent records, and wherein the parent record of the plurality of parent records is read-accessible while the plurality of child records are being updated;

calculating, by the one or more computing devices, a sum of the counts corresponding to the plurality of child records of the parent record of the plurality of parent records during the specified time period as a parent count;

obtaining, by the one or more computing devices, a row lock on the parent record of the plurality of parent records at time intervals within the specified time period, the time intervals having a duration determined using a machine learning algorithm to reflect an accurate record value while minimizing computing resources used;

replacing, by the one or more computing devices, responsive to obtaining the row lock on the parent record, an original value of the parent count with the sum of the counts, wherein the row lock on the parent record of the plurality of parent records occurs at pre-determined intervals within the specified time period;

transmitting, by the one or more computing devices, an updated value of the parent count to an application comprising a graphical user interface (GUI); and displaying, by the one or more computing devices, a list of the plurality of parent records sorted by the parent counts in the GUI.

2. The method of claim 1, wherein each child record of the plurality of child records has a corresponding count and an associated parent record within the plurality of parent records.

3. The method of claim 1, wherein the displaying, by the one or more computing devices, of the list of the plurality of parent records sorted by the parent counts during the specified time period occurs at the pre-determined intervals within the specified time period.

4. The method of claim 1, wherein determining the length of said pre-determined intervals within the specified time period using machine-learning further comprises logic involving a neural network with features associated with the table, where each feature forms part of an input layer of the neural network.

5. The method of claim 4, wherein the neural network includes the input layer, a hidden layer, and an output layer, wherein each feature associated with the table is a node in the input layer, collectively forming a first number of nodes, wherein each of a plurality of candidate time intervals are present as a node in the output layer, collectively forming a second number of nodes, and wherein the number of nodes in the hidden layer is between the first and second number of nodes.

6. The method of claim 4, wherein each feature associated with the table is present as an individual node in the input layer of the neural network, and each of a plurality of candidate time intervals are present as an individual node in an output layer of the neural network, the method further comprising:
receiving, by the one or more computing devices, training data, with sets of input data corresponding to values for each node of the input layer of the neural network, and a designated optimum time interval for each set of input data, the designated optimum time interval corresponding to a candidate time interval in the output layer of the neural network model;
training the neural network based on the training data by the one or more computing devices; and
using the trained neural network on the set of input data corresponding to the values derived from the table of the database to select a candidate time interval node in the output layer as the pre-determined interval within the specified time period, by the one or more computing devices.

7. The method of claim 1, wherein the method is executed by a GPU processor.

8. A system comprising:
a memory;
a database in said memory;
a processor coupled to the memory, the processor configured to:
obtain a row lock on a plurality of child records and update counts corresponding to the plurality of child records during a specified time period during which the update is permitted, wherein the plurality of child records are part of a table in said database with a plurality of child and parent records, wherein the plurality of child records are children of a parent record of the plurality of parent records, and wherein the parent record of the plurality of parent records is read-accessible while the plurality of child records are being updated;
calculate a sum of counts corresponding to the plurality of child records of the parent record of the plurality of parent records during the specified time period as a parent count;
obtain a row lock on the parent record of the plurality of parent records at time intervals within the specified time period, the time intervals having a duration determined using a machine learning algorithm to reflect an accurate record value while minimizing computing resources used;
replace, responsive to obtaining the row lock on the parent record, an original value of the parent count with the sum of the counts;
transmit an updated value of the parent count to an application comprising a graphical user interface (GUI); and
display a list of the plurality of parent records sorted by the parent counts in the GUI.

9. The system of claim 8, wherein each child record of the plurality of child records has a corresponding count and an associated parent record within the plurality of parent records.

10. The system of claim 8, wherein the processor is further configured to display the list of the plurality of parent records sorted by the parent counts during the specified time period at pre-determined intervals within the specified time period.

11. The system of claim 8, wherein the processor is further configured to:
determine the length of said pre-determined intervals within the specified time period using machine-learning logic involving a neural network with features associated with the table each having a value, where each feature forms part of an input layer of the neural network.

12. The system of claim 11, wherein the neural network includes an input layer, a hidden layer, and an output layer, wherein each feature associated with the table is a node in the input layer, collectively forming a first number of nodes, wherein each of a plurality of candidate time intervals are present as a node in the output layer, collectively forming a second number of nodes, and wherein the number of nodes in the hidden layer is between the first and second number of nodes.

13. The system of claim 11, wherein each feature associated with the table is present as an individual node in the input layer of the neural network, and each of a plurality of candidate time intervals are present as an individual node in an output layer of the neural network, the processor further configured to:
receive training data, with sets of input data corresponding to values for each node of the input layer of the neural network, and a designated optimum time interval for each set of input data, the designated optimum time interval corresponding to a candidate time interval in the output layer of the neural network model;
train the neural network based on the training data; and
use the trained neural network on the set of input data corresponding to the values derived from the table of the database to select a candidate time interval node in the output layer as the pre-determined interval within the specified time period.

14. The system of claim 8, wherein the processor coupled to the memory is a GPU processor.

15. A non-transitory computer-readable medium storing instructions that when executed by at least one or more processors of a computing device cause the one or more processors to perform operations comprising:
obtaining a row lock on a plurality of child records and update counts corresponding to the plurality of child records during a specified time period during which the update is permitted, wherein the plurality of child records are part of a table in said database with a plurality of child and parent records, wherein the plurality of child records are children of a parent record of the plurality of parent records, and wherein the parent record of the plurality of parent records is read-accessible while the plurality of child records are being updated;
calculating a sum of counts corresponding to the plurality of child records of the parent record of the plurality of parent records during the specified time period as a parent count;

obtaining a row lock on the parent record of the plurality of parent records at time intervals within the specified time period, the time intervals having a duration determined using a machine learning algorithm to reflect an accurate record value while minimizing computing resources used;

replacing, responsive to obtaining the row lock on the parent record, an original value of the parent count with the sum of the counts;

transmitting an updated value of the parent count to an application comprising a graphical user interface (GUI); and displaying a list of the plurality of parent records sorted by the parent counts in the GUI.

16. The device of claim 15, wherein each child record of the plurality of child records has a corresponding count and an associated parent record within the plurality of parent records.

17. The device of claim 15, wherein the displaying of the list of the plurality of parent records sorted by the parent counts during the specified time period occurs at the pre-determined intervals within the specified time period.

18. The device of claim 15, wherein determining the length of said pre-determined intervals within the specified time period by machine-learning further comprises logic involving a neural network with features associated with the table each having a value, where each feature forms part of the input layer of the neural network.

19. The device of claim 18, wherein the neural network includes an input layer, a hidden layer, and an output layer, wherein each feature associated with the table is a node in the input layer, collectively forming a first number of nodes, wherein each of a plurality of candidate time intervals are present as a node in the output layer, collectively forming a second number of nodes, and wherein the number of nodes in the hidden layer is between the first and second number of nodes.

20. The device of claim 19, wherein each feature associated with the table is present as an individual node in the input layer of the neural network, and each of a plurality of candidate time intervals are present as an individual node in the output layer of the neural network, the operations further comprising:

receiving training data, with sets of input data corresponding to values for each node of the input layer of the neural network, and a designated optimum time interval for each set of input data, the designated optimum time interval corresponding to a candidate time interval in the output layer of the neural network model;

training the neural network based on the training data; and using the trained neural network on the set of input data corresponding to the values derived from the table of the database to select a candidate time interval node in the output layer as the pre-determined interval within the specified time period.

* * * * *